E. C. MERSHON.
STRAIGHT EDGING DEVICE FOR RIP SAW TABLES.
APPLICATION FILED APR. 30, 1915.
1,181,402.
Patented May 2, 1916.
2 SHEETS—SHEET 2.
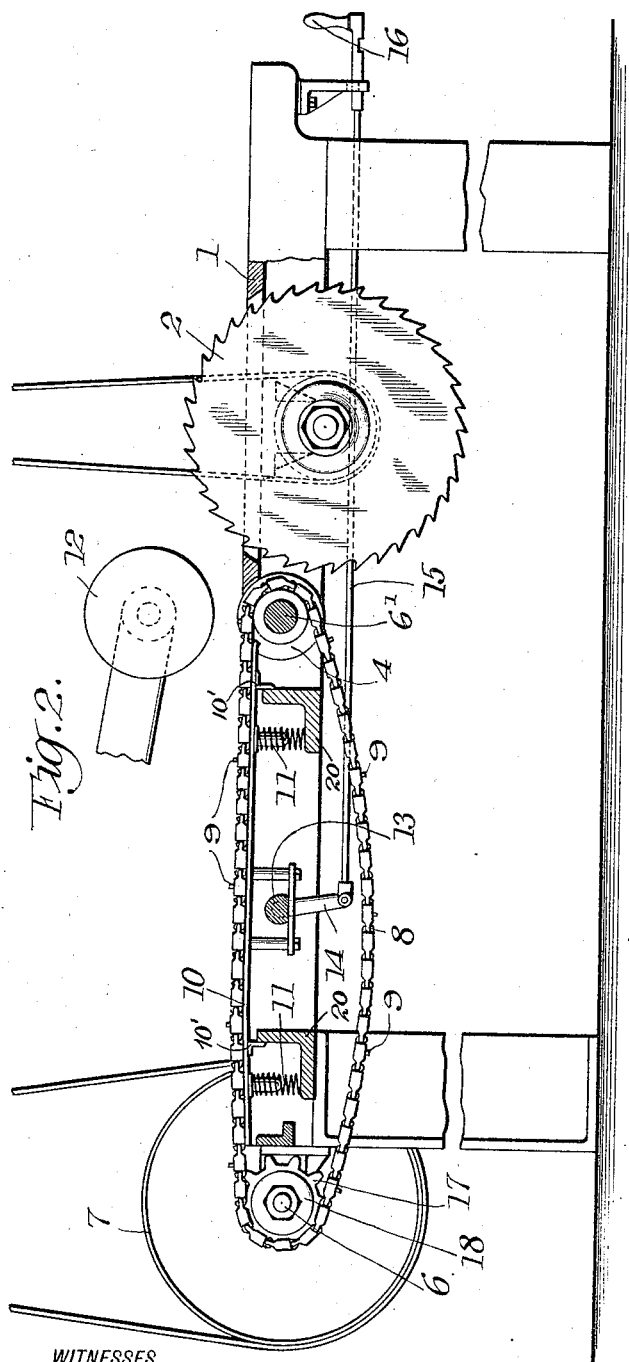
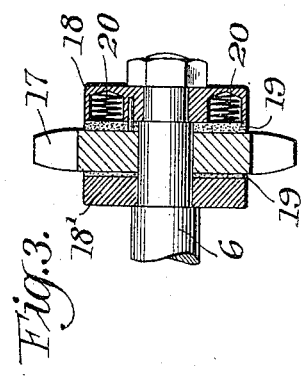
WITNESSES
F. B. Townsend
Edwin Robinson
INVENTOR
Edward C. Mershon.
BY
Townsend & Decker
ATTORNEYS.

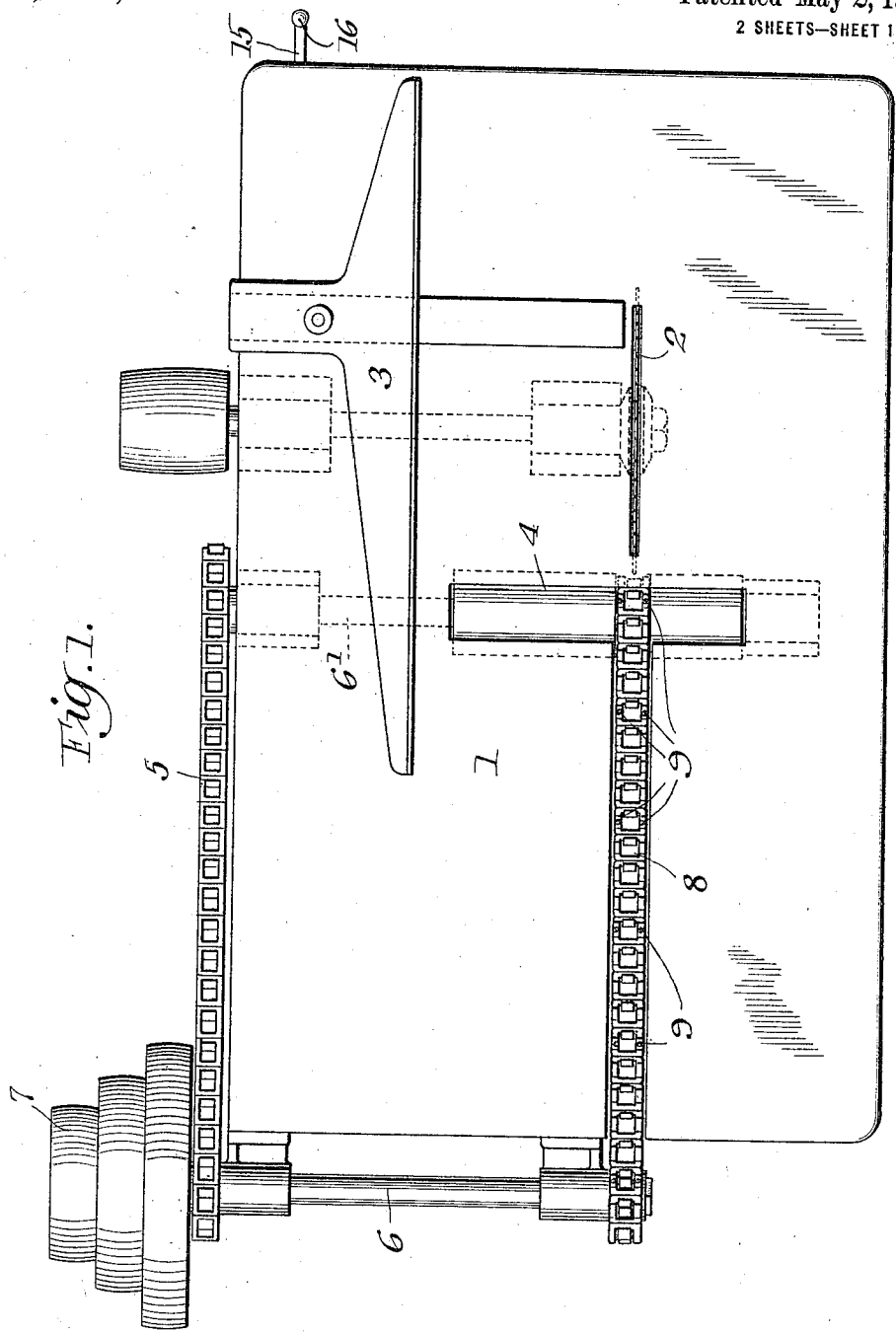

UNITED STATES PATENT OFFICE.

EDWARD C. MERSHON, OF SAGINAW, MICHIGAN, ASSIGNOR TO WILLIAM B. MERSHON & COMPANY, OF SAGINAW, MICHIGAN, A CORPORATION OF MICHIGAN.

STRAIGHT-EDGING DEVICE FOR RIP-SAW TABLES.

1,181,402.   Specification of Letters Patent.   Patented May 2, 1916.

Application filed April 30, 1915.   Serial No. 24,872.

*To all whom it may concern:*

Be it known that I, EDWARD C. MERSHON, a citizen of the United States, and a resident of Saginaw, in the county of Saginaw and State of Michigan, have invented certain new and useful Improvements in Straight-Edging Devices for Rip-Saw Tables, of which the following is a specification.

My invention relates to sawing machines for lumber and more particularly to a device whereby the lumber or stock may be guided in its progress during the sawing operation.

The invention is applicable both to band and circular saw machines and especially to machines whether having band or circular saws which are employed in "ripping" the stock.

The object of the invention is to provide a simple and efficient device whereby the stock may be accurately guided in a straight line when it is desired to use the machine for producing a straight edge without employing the usual fence or lumber guide.

A machine provided with my improved attachment may be used both for the usual operation of ripping the lumber while it is engaged against the ordinary lumber guide or fence and may also conveniently be used for producing the first straight edge on a piece of stock independently of said fence or guide as is sometimes required where both edges of the stock are irregular.

The invention will be described in connection with a machine having a circular saw, from which description the manner of application and use of the same for a band saw machine will be obvious to those skilled in the art.

Briefly stated, my invention consists in the combination with an endless flexible spur carrier having spurs adapted to engage the surface of the board or stock and mounted so that a portion of the same will have a substantially straight run parallel with the surface of the saw table and adapted to engage the surface of the lumber simultaneously by a number of said spurs to guide it in a straight line, of a spring-actuated support plate supporting the chain and spring-pressed upward so as to elevate the chain and spurs above the table top to a greater or less extent to insure the engaging of the spurs with the lower face of any stock passing through the machine in the course of being edged and to thereby guide the stock in a straight line parallel with the saw blade.

My invention likewise relates to the combination with a sawing machine having the usual or any proper devices for feeding the stock positively, of a supplemental endless spur carrier engaging and guiding the stock and a supplemental friction drive for said spur carrier acting on the same to eliminate the retarding friction thereof and to compensate for variation in the rate of feed of the positively acting feed mechanism for the stock.

In the accompanying drawings: Figure 1 is a general plan view of a sawing machine having a circular saw and equipped with my invention. Fig. 2 is a general side elevation of the same, the parts being shown in vertical section. Fig. 3 is a cross-section through the friction drive for the endless spur carrier.

1 is the usual saw table, 2 the circular saw and 3 the lumber guide or fence adapted for use in conjunction with the saw in the usual manner for ripping lumber.

4 is the usual feed roll whose upper edge projects slightly above the top plane of the table 1 and which is driven conveniently by a chain or belt 5 from a shaft 6 carrying the usual or any suitable drive pulley 7, said feed roll operating in conjunction with a suitable presser roll or rolls 12 and positively driven by the means described or any other suitable means serves to positively feed the stock between said feed roll and presser roll.

Such other parts or attachments as it may be desired to use or as may be usually employed in connection with the circular saw in the ordinary operation of the same, or as would be used in connection with a band saw in the usual operation of the same, to which my present invention might be applied, are not herein referred to specifically as they do not substantially affect the mode of operation of the improved attachment forming my present invention.

8 indicates an endless carrier formed preferably as a chain carrying at intervals spurs 9 adapted to engage the surface of the stock or lumber running through the machine when the chain is lifted to bring the spurs above the surface of the table and the stock is pressed down upon the same. Said chain runs over the wheels one of which is carried by drive shaft 6 and the other of which turns loosely upon the shaft 6' upon which the feed roll is mounted.

As shown in the plan view Fig. 1, the top of the table is provided with a slot immediately over the chain or carrier to permit the spurs to be projected above the plane of the table. 10 is a support plate for the straight run of the chain or carrier or portion of the same which runs parallel to the table top and engages by its spurs with the lower surface of the stock. Said support plate is spring-pressed upward by means of suitable springs 11 applied as shown beneath the plate and suitably supported in turn by brackets or elbow-pieces carried by the table or frame of the machine. The plate itself is provided preferably with depending pins or posts encircled by the springs and also with studs or plates 10' which engage or slide against the face of the cross-piece 20 of the frame and thereby properly guide the plate in its up and down movements. By these means I insure the engaging of the spurs with the lower face of the stock whenever the plate is freed from the restraint of the devices which I prefer to employ for lowering it and thereby lowering the chain, so that its spurs will be below the surface of the table and thereby leave the machine in condition to be operated in the usual way. When engaged with the lumber and during the operation of the machine, said spurs operate to guide it in a straight line parallel with the saw blade and effectually prevent any swerving of the lumber from the true line of feed.

12 indicates a suitable press roll that may be used in conjunction with the chain carrier to insure the engagement of the spurs with the lower face of the stock. To permit the chain carrier to be lowered or raised at will, so that the points of the spurs will be depressed below the horizontal plane of the table top or allowed to project into position above it, a cam 13 or other suitable device mounted in suitable bearings under the said table may be used and operate upon a yoke secured, as shown in the side elevation, to the under side of the plate 10. When the flat or low side of the cam is presented to the yoke, the springs 11 are allowed to exert their action and raise the plate and chain to a sufficient height to cause the spurs to engage with the stock. When the cam is turned, however, by operating the arm 14 secured to the cam shaft, the high side of the cam acts to depress the plate 10, allowing the chain to drop the spurs below the table top. The cam may be operated by rod 15 or any other suitable device extending to the front of the machine and there provided with a suitable handle 16 and catch to hold the parts in position for depressing the plate 10 and chain.

It is evident that to insure perfect operation of the device under all conditions, especially in cross-grained material, it is important that the spurs do not change their point of contact with the stock. Thus, if the chain were positively driven and anything happened to cause the board in contact with the spurs to move at a slower speed than the chain traveled, the spur points might follow the grain and thus turn the material being edged from its straight course, resulting in a crooked edge in place of a straight edge. To prevent this as well as to eliminate retarding friction between the plate and chain, to correct any error in the rate of travel of the chain by wear or lengthening of the chain links or in rate of feed-roll periphery speed, I connect the drive shaft 6 with the sprocket wheel 17 or other drive wheel for the endless carrier or chain through a friction drive device constructed in the following or any other suitable way.

As shown more particularly in Fig. 3, said sprocket wheel is mounted on the drive shaft between two collars 18, 18'. The said collars are so attached to the shaft as to turn in unison therewith, while the sprocket wheel 17 is free to turn on the shaft. Between the opposed faces of the sprocket and collars are interposed frictional washers or disks 19 consisting of fiber or other suitable material. Coiled springs 20 in the collar 18 press against the fiber washer and cause the sprocket to move in unison with the shaft 6 under normal conditions but when an abnormal condition exists, causing the stock passing through the machine to move at a slower speed, the spring pressure exerted against these fiber washers will permit the sprocket to rotate at a speed in unison with the speed of the material fed through the machine, rather than at the speed of the shaft 6.

In the operation of my machine the actual work of feeding is not done by the endless guide described although the same is driven or moved in the direction of the feed but is performed by the positive action of the feed roll 4 and complementary devices or by other positively acting means, the office of the endless spur carrier being simply and primarily that of a guide and the supplemental friction drive therefor being engaged simply to eliminate any retarding friction that might exist between the endless spur carrier and the spring-pressed plate upon which it rests and which obviously would tend to retard the progress of the stock under the action of the positive feed mechanism. The said friction drive also operates to correct any error in rate of travel of the chain by wear or lengthening of chain links and in a way compensates for any variation of rate of feed-roll periphery speed. Briefly stated, the friction drive causes the guide to travel at a speed uniform with that of the positively fed stock positively fed by other devices.

When my improved guiding device is out of action, that is, when the spurs on the chain are dropped below the plane of the table top, the machine may be operated in the usual way, the lumber or stock being caused to follow the lumber guide or fence and being then ripped in the usual way. When it is desired to straight-edge stock and rip it independently of said guide or fence, the handle 16 is operated to relieve the plate of the restraining action of the cam and leave it to the action of the springs 11 which will then elevate the run of chain and so that the sharpened spurs will engage by a spring pressure with the under side of the board which is being edged and guide the same straight through the machine without permitting the stock to swing or turn to one side during the operation.

What I claim as my invention is:—

1. The combination with a sawing machine, of an endless spur carrier having a substantially straight run provided with spurs adapted to engage the surface of the stock and a spring-actuated support plate beneath said carrier as and for the purpose described.

2. The combination with a sawing machine, of an endless spur carrier having a straight run provided with spurs adapted to engage the stock in a substantially straight line parallel to the line of feed, a spring-actuated support plate for said carrier and means for lowering said support against the action of the spring or springs to bring the spurs beneath the plane of the table or releasing the same to the action of the springs at will.

3. The combination with a sawing machine provided with a positive power feed for the stock, of a stock guide consisting of an endless spur carrier provided with a number of spurs adapted to simultaneously engage the surface of the stock in a straight line parallel with the line of cut, said guide being adapted to travel at a speed uniform with that of the stock passing through the machine through contact of the spurs with the surface of the positively driven stock and an independent supplemental friction drive for said guide for positively operating the same independently of the action of the stock feed and stock, said friction drive being adjusted to slip before the contact of the spurs and surface of stock is disturbed as and for the purpose described.

Signed at Saginaw, in the county of Saginaw and State of Michigan, this 26th day of April, A. D. 1915.

EDWARD C. MERSHON.

Witnesses:
JOHN N. RICHTER,
A. A. EASTERLY.

Copies of this patent may be obtained for five cents each, by addressing the "Commissioner of Patents, Washington, D. C."